US009444272B2

(12) United States Patent
Bryngelsson et al.

(10) Patent No.: US 9,444,272 B2
(45) Date of Patent: Sep. 13, 2016

(54) ENERGY STORAGE SYSTEM BALANCING DEVICE

(75) Inventors: Hanna Bryngelsson, Göteborg (SE); Niklas Legnedahl, Onsala (SE)

(73) Assignee: Volvo Lastvagnar AB, Göteborg (SE)

( * ) Notice: Subject to any disclaimer, the term of this patent is extended or adjusted under 35 U.S.C. 154(b) by 253 days.

(21) Appl. No.: 14/363,804

(22) PCT Filed: Dec. 8, 2011

(86) PCT No.: PCT/EP2011/006177
§ 371 (c)(1),
(2), (4) Date: Aug. 18, 2014

(87) PCT Pub. No.: WO2013/083141
PCT Pub. Date: Jun. 13, 2013

(65) Prior Publication Data

US 2015/0295425 A1 Oct. 15, 2015

(51) Int. Cl.
*H02J 7/00* (2006.01)
*B60L 11/18* (2006.01)

(52) U.S. Cl.
CPC .......... *H02J 7/0016* (2013.01); *B60L 11/1861* (2013.01); *H02J 7/0024* (2013.01); *H02J 7/0019* (2013.01); *Y02T 10/7055* (2013.01)

(58) Field of Classification Search
CPC .................................................... H02J 7/1423
USPC ........................................................ 320/126
See application file for complete search history.

(56) References Cited

U.S. PATENT DOCUMENTS 5,905,360 A 5/1999 Ukita
5,982,143 A * 11/1999 Stuart ................ H01M 10/441 320/119
6,841,971 B1 * 1/2005 Spee .................... H01M 10/44 320/119
7,061,207 B2 * 6/2006 Patel .................... H02J 7/0018 320/116
2007/0247115 A1 10/2007 Ishikawa et al.
(Continued)

FOREIGN PATENT DOCUMENTS

CN 201774287 U 3/2011
EP 1942568 A1 7/2008

OTHER PUBLICATIONS

International Search Report (Sep. 17, 2012) for corresponding International App. PCT/EP2011/006177.
(Continued)

*Primary Examiner* — Suresh Memula
(74) *Attorney, Agent, or Firm* — WRB-IP LLP

(57) ABSTRACT

An energy storage system balancing device arranged to perform balance processing of charge states of a plurality of energy storage systems being disconnected from each other and from external loads is provided. Each of the storage systems is divided into a plurality of cells and at least one equalization device is arranged in each storage system for balancing the cells within the system. The balancing device is arranged to at least collect information about voltage of at least one cell in each storage system from the equalization device/-s and determine a balancing status of the storage systems on the basis of the collected information. The balancing device is further arranged to determine a target cell voltage in dependency of the balancing status and provide the target voltage to each equalization device to control the balancing of the cells.

6 Claims, 3 Drawing Sheets

19 A balancing device at least collecting information about voltage of at least one cell in each storage system from the equalization device/-s.

20 The balancing device further determining a balancing status of the storage systems.

21 Said balancing device further determining a target cell voltage in dependency of the balancing status.

22 Said balancing device further providing the target voltage to each equalization device to control said balancing of the cells.

(56) References Cited

U.S. PATENT DOCUMENTS

2009/0072793 A1 3/2009 Chang et al.
2010/0097034 A1* 4/2010 Shu ....................... H02J 7/0004 320/126
2011/0127963 A1 6/2011 Murao et al.
2013/0200851 A1* 8/2013 Bieler .................. H02J 7/0063 320/126

OTHER PUBLICATIONS

International Preliminary Report on Patentability (Apr. 8, 2014) for corresponding International App. PCT/EP2011/006177.
Chinese Official Action (Jul. 5, 2016) for corresponding Chinese Application 201180075403.7.

* cited by examiner

ENERGY STORAGE SYSTEM BALANCING DEVICE

BACKGROUND AND SUMMARY

The present invention relates to an energy storage system balancing device arranged to perform balance processing of charge states of a plurality of energy storage systems being disconnected from each other and from at least one external load. The present invention also relates to a vehicle system. It further relates to a method for performing said balance processing.

Chargeable and dischargeable electric energy storage systems, normally called batteries, are used in many applications. Since the introduction of hybrid and electrical vehicles, the need has increased for optimizing the batteries in order to be able to optimize charging, storage and use of the electrical energy.

The battery modules each have a plurality of battery cells (electric cells) connected in series and/or in parallel. Charge-discharge characteristics ma vary among the plurality of battery cells. Therefore, it is preferable that charge-discharge of each battery cell is individually controlled in order to balance the cells within the battery to prevent the battery cell from being over-charged or over-discharged.

Consequently, each battery comprises at least one equalization system arranged to balance the cells within the battery. The number of equalization systems may vary in dependency of the number of cells, if the battery comprises battery modules mounted together to form the battery, and if one equalization system is used to control one or a plurality of cells. Despite the number of equalization systems, all the cells of the battery is monitored and managed by said systems to ensure an optimization of the battery over time and in capacity.

US 2011/0127963 disclose an equalization device. The device is arranged to perform equalization processing of charge states of a plurality of battery cells that are connected in series, wherein the plurality of battery cells are divided into a plurality of groups. The equalization device includes a detector arranged to detect the charge states of the plurality of battery cells, a selector arranged to select any of the plurality of groups based on the charge states detected by the detector, and an equalization processing unit arranged to perform the equalization processing by selectively causing the battery cells that belong to the group selected by the selector to discharge.

When connecting two or more batteries in parallel, it is important that they are at the same state of charge (SOC) in order to have a uniform distribution of power and equal life time. Once the batteries are connected to each other they will strive to reach the same voltage level since they are physically connected to each other. This is a wanted feature since they will, if the time is long enough, reach the same pack voltage and by that the same SOC level permitted that the temperature is kept constant. By this the batteries in the system will try to share the workload and distribute the energy evenly.

There is then a challenge to ensure that the State Of Charge (SOC) for the different batteries is the same in order to have a uniform distribution of power and equal life time. If the batteries have different SOC at the time of connection to each other they will not automatically converge to the same SOC even though they stabilize to the same voltage level. This will also result in that the life time differs between the batteries. If the batteries are used at different SOC caused by unbalanced batteries, there is a risk that one battery will be used excessively and hence have an accelerated aging.

It is desirable therefore to ensure so that the charge state is the same for a plurality of batteries being connected to each other.

According to an aspect of the present invention, an energy storage system balancing, device arranged to perform balance processing of charge states of a plurality of energy storage systems being disconnected from each other and from external loads. Each of said storage systems is divided into a plurality of cells and at least one equalization device is arranged in each storage system for balancing the cells within said system. Said balancing device is arranged to at least collect information about voltage of at least one cell in each storage system from the equalization device/-s and determining a balancing status of the storage systems on the basis of the collected information. Said balancing device is further arranged to determine a target cell voltage in dependency of the balancing status and provide the target voltage to each equalization device to control said balancing of the cells.

According to another aspect of the invention, a vehicle system is provided comprising the energy storage system balancing device.

According to another aspect of the invention, a method for balance processing of charge states of a plurality of energy storage systems being disconnected from each other and from external loads. Each of said storage system is divided into a plurality of cells and at least one equalization device is arranged in each storage system for balancing the cells within said system. The balancing device performs the steps of:

- at least collecting information about voltage of at least one cell in each storage system from the equalization device/-s,
- determining a balancing status of the storage systems on the basis of said collected information,
- determining a target cell voltage in dependency of the balancing status,
- providing the target voltage to each equalization device to control said balancing of the cells.

With aspects of the present invention, the batteries are controlled to be in the same charge state region, which means that they will have the same power performance and energy performance. This also means that the batteries are used equally and will degrade simultaneously. The remaining capacity of the battery set will be known all the time and the lifetime will be optimized. Further, connecting batteries together instead of increasing cells in one battery will have more benefits.

BRIEF DESCRIPTION OF THE DRAWINGS

The present invention will now be described more in detail with reference to the appended drawings, where.

DETAILED DESCRIPTION

The embodiments of the invention with further developments described in the following are to be regarded only as examples and are in no way to limit the scope of the protection provided by the claims.

The present invention relates to an energy storage system balancing device and vehicle system arranged to perform balance processing of charge states of a plurality of energy storage systems being disconnected from each other and from at least one external load. Even though the detailed description mainly describes the balancing device, the person skilled in the art realizes that the method for balance processing is also disclosed in the description.

Figure 1:
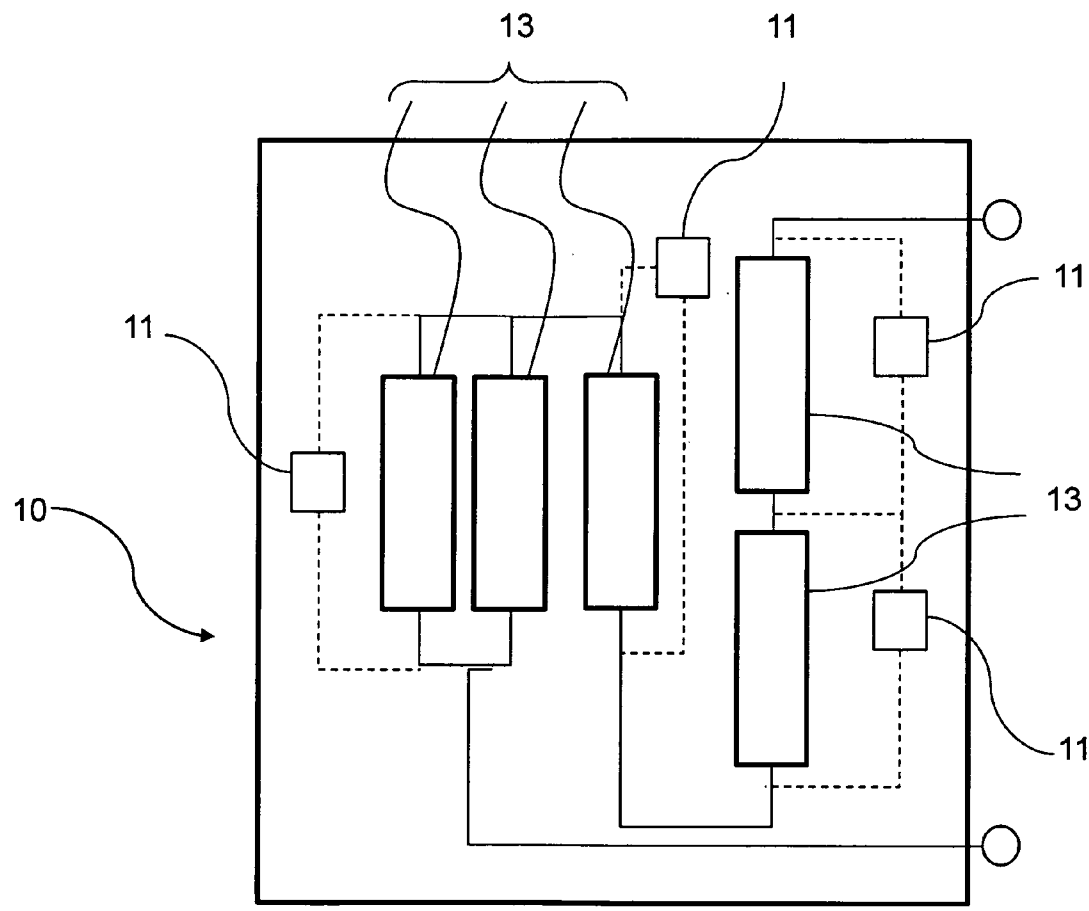
FIG. 1 illustrates a block diagram showing the configuration of an energy storage system.

FIG. 1 illustrates a block diagram showing the configuration on an energy storage system 10, in the following exemplified by a battery. A person skilled in the art realized that other energy storage system comprises the necessary features is also embraced within the present invention. The battery has a plurality of battery cells 13 (electric cells) connected in series and/or in parallel. The cell architecture of FIG. 1 is an example intended to illustrate that cells may be arranged in parallel and in series within the battery.

Charge-discharge characteristics may vary among the plurality of battery cells 13. Therefore, in order to ensure balancing of charge state, each battery cell is individually controlled by an equalization device 11. This is to prevent the battery from being over-charged or over-discharged. Consequently, each battery comprises at least one equalization system arranged to balance the cells within the battery.

The number of equalization systems 11 may vary in dependency of the number of cells 13, if the battery comprises battery modules mounted together to form the battery, and if one equalization system is used to control one or a plurality of cells. Despite the number of equalization systems, all the cells of the battery is monitored and managed by said systems to ensure an optimization of the battery over time and in capacity. Details about the equalization device will not be described in the present patent application and a person skilled in the art would realize that different types of equalization devices may be used with the present invention. As will be shown in the following, information about the charge state of the individual cell will be collected and used for further balance processing.

When connecting two or more batteries in parallel, it is important that they are at the same state of charge (SOC) in order to have a uniform distribution of power and equal life time. It is therefore a challenge to ensure that the State Of Charge (SOC) for the different batteries is the same in order to have a uniform distribution of power and equal life time. If the batteries have different SOC at the time of connection to each other they will not automatically converge to the same SOC even though they stabilize to the same voltage level. This will also result in that the life time differs between the batteries.

Figure 2:
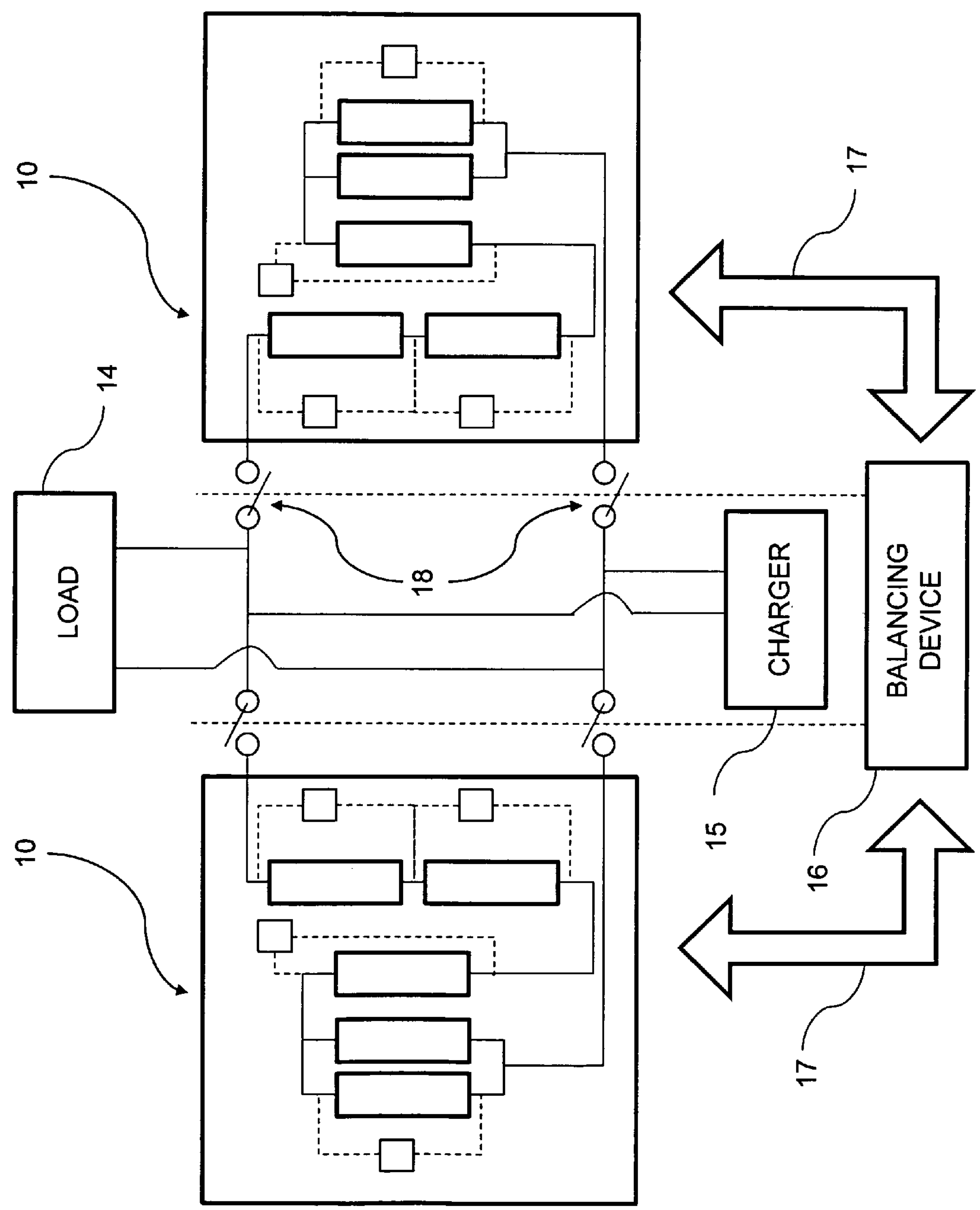
FIG. 2 illustrates a block diagram shown the configuration of an arrangement with a plurality of energy storage systems being balanced be a balancing device.

The present invention therefore proposes an energy storage system balancing device 16, see FIG. 2, arranged to perform balance processing of charge states of a plurality of energy storage systems. In order to perform said balancing, the energy systems are disconnected from each other and from all external loads 14. The balancing device is preferably is arranged to disconnect the storage systems from each other and the load before determining the balancing, status.

What particularly characterizes the balancing device 16 is that it is arranged to at least collect information about voltage of at least one cell 13 in each storage system 10 from the equalization device/-s 11 and determine a balancing status of the storage systems 10 on the basis of the collected information. The device is further arranged to determine a target cell voltage in dependency of the balancing status and provide the target voltage to each equalization device to control said balancing of the cells 13.

This means that the balancing device 16 collects information about the voltage from the equalization devices 13 via connections 17. These connections are wired or wireless and preferably based on a suitable protocol (digital information). A person skilled in the art realizes that different connections are embraced within the scope of the present invention. The balancing device then send the target voltage value back to the equalization devices and said devices uses this information to balance (charge, discharge) the cells to approximately the same voltage level.

The scope of the present invention is consequently to control the balancing in each cell 13 in each energy storage device 10 intended to be connected to each other. This control is based on a determination of the charge state of each cell in each energy storage system. The fundamental condition is that the energy storage systems (battery packs) 10 are not connected to each other or a load 14 when the balancing procedure starts.

With the present invention, the batteries are controlled to be in the same charge state region, which means that they will have the same power performance and energy performance. This also means that the batteries are used equally and will degrade simultaneously. The remaining capacity of the battery set will be known all the time and the lifetime will be optimized. Further, connecting batteries together instead of increasing cells in one battery will have more benefits.

Figure 3:
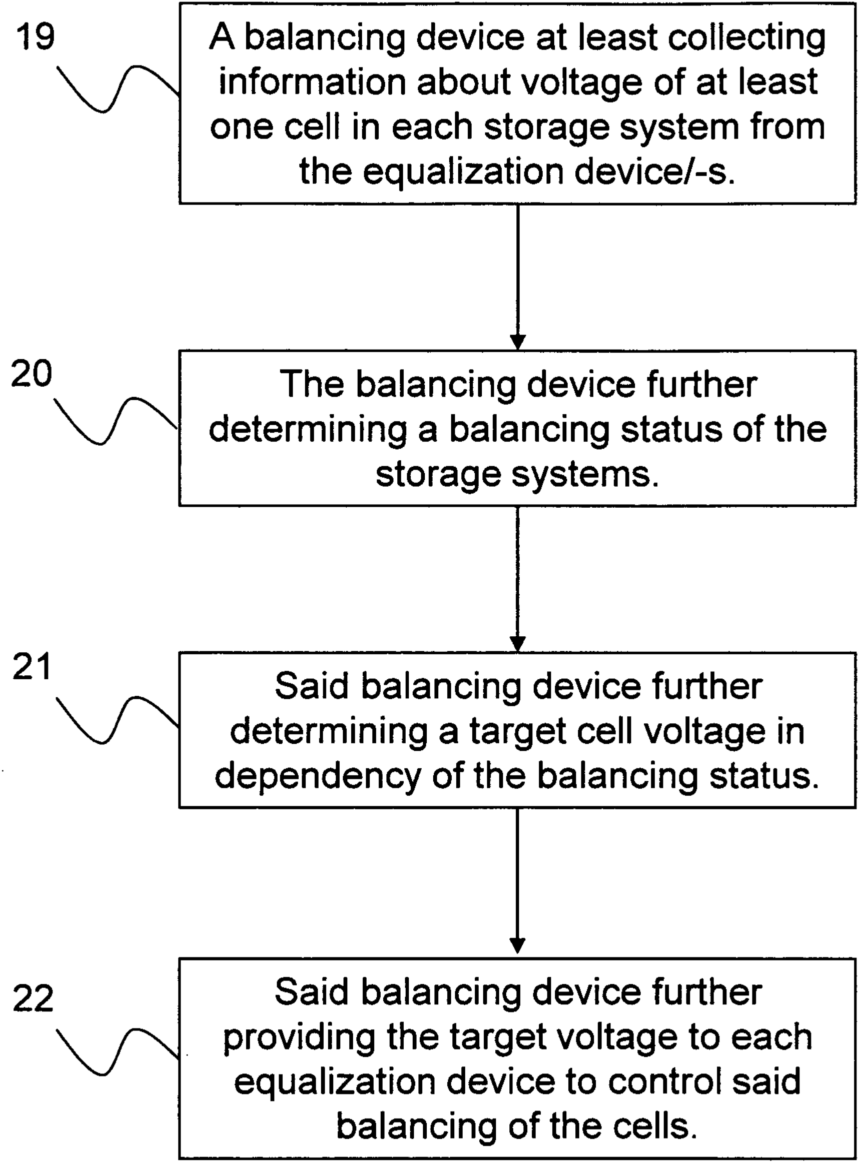
FIG. 3 illustrates in a flow diagram a method according to the present invention.

The present invention is also related to a method for performing said balance processing. In the method, the following four steps are performed, see FIG. 3:

1. A balancing device 16 at least collecting 19 information about voltage of at least one cell 13 in each storage system from the equalization device/-s 11.

2. Said balancing device 16 further determining 20 a balancing status of the storage systems 10 on the basis of said collected information.

3. Said balancing device 16 further determining 21 a target cell voltage in dependency of the balancing status.

4. Said balancing device 16 providing 22 the target voltage to each equalization device 11 to control said balancing of the cells 13.

A vehicle system may comprise the energy storage system balancing device. This means that the balancing may start when the vehicle has been turned off (key off) and the balancing device at the same time disconnects the storage systems from each other and the load. The status of the energy storage systems (battery packs) is then measured when the key is turned off.

If the energy storage systems are unbalanced, the balance process comprises a procedure where the balancing device 16 discharge and/or charge the storage systems 10 to achieve the same or a similar charge state for said storage systems. Charging and discharging is preferably coordinated so that the balance procedure is as efficient (energy losses, time) as possible.

The present invention is not limited to a certain charge/discharge procedure for achieving an efficient charge/discharge of the energy storage systems. Charging may be performed by a charger 15 and discharging is performed by burning energy over a resistance, either the commonly used resistances in the energy storage systems or if needed also over an external resistance.

If the balancing device 16 is arranged in a vehicle system, the vehicle system may contribute with the discharge and/or charge of storage systems to achieve the same or a similar charge state for said storage systems. Charging is then performed by the vehicle system (power from a generator, an external power resource or similar). Discharging is performed by connecting a load 14 in the vehicle system.

The balancing device 16 preferably controls the charging and discharging by controlling switches 18. By selective coupling and decoupling of the switches the energy storage systems can be connected or disconnected to each other, a load 14 or a charger 15. The reason to use a load 14 and a charger 15 is to get to a beneficial start condition and/or equalize the start conditions for the energy storage systems which will lead to an improved and faster balancing of the energy storage systems.

The balancing device 16 may further collect information about temperature of at least one cell from the equalization device/-s. It is preferable to account for temperature and hysteresis differences when determining the charge state. Any information collected from the equalization devices/-s and used to determine the charge state of each energy storage system is embraced within the present invention.

The balancing device is preferably arranged to provide the target voltage to each equalization device 11 in all storage systems 10 to which it is connected. Furthermore, the energy storage system 10 balancing device 16 is further arranged to wait with the determination of the balancing status until a time period has passed after the storage systems are disconnected from each other and from the load. In this way, it is ensured that the energy storage will have time to go into non-operative mode, and thereby the determination will results in better results. A time period of 20 minutes may be preferable for use within vehicle systems.

While preferred embodiments of the present invention have been described above, it is to be understood that variations and modifications will be apparent to those skilled in the art without departing the scope and spirit of the present invention. The scope of the present invention, therefore, is to be determined solely by the following claims, as interpreted by the description and drawings.

FIG. 2 shows bow the balancing device 16 operates switches 18 in order to disconnect and connect the energy storage systems 11 for charging and discharging. During the balancing procedure, the energy storage systems are disconnected from the system to which it proved energy during operation. If the balancing device is arranged in a vehicle, the balancing device operates other switches (not shown) in order to disconnect and connect the storage systems to the vehicle systems. When the key is turned off, the energy storage systems are disconnected from the vehicle system. When the key is turned on, the energy storage systems are again connected to the vehicle system to provide energy used to operate the vehicle. When the storage systems are again connected to the vehicle system, the balancing procedure of the present invention is interrupted.

The invention claimed is:

1. A battery balancing device arranged to perform balance processing of charge states of a plurality of batteries, where the batteries are adapted to be connected in parallel and where the balancing device is adapted to disconnect the batteries from each other and from external loads before a balancing status is determined, wherein each of the batteries is divided into a plurality of battery cells and wherein at least one equalization device is arranged in each battery for balancing the battery cells within the battery, wherein the balancing device being arranged to at least collect information about voltage of at least one battery cell in each battery from the at least one equalization device and determining the balancing status of the batteries on the basis of the collected Information, the balancing device further being arranged to determine a target cell voltage for at least one battery cell in dependency of the balancing status and provide the target cell voltage to each equalization device to control the balancing of the battery cells, where the balancing device is arranged to discharge and/or charge the batteries to achieve the same or a similar charge state for the batteries when the balance process is completed.

2. The battery balancing device according to claim 1, wherein the balancing device is further arranged to collect information about temperature of at least one battery cell from the at least one equalization device.

3. The battery balancing device according to claim 1, wherein the balancing device is arranged to provide the target cell voltage to each equalization device in all batteries to which it is connected.

4. The battery balancing device according to a claim 1, wherein the balancing device is arranged to wait with the determination of the balancing status until a time period has passed after the batteries are disconnected from each other and from the load.

5. A vehicle system comprising a battery balancing device arranged to perform balance processing of charge states of plurality of batteries, where the batteries are adapted to be connected in parallel and where the balancing device is adapted to disconnect the batteries from each other and from external loads before a balancing status is determined, wherein each of the batteries is divided into a plurality of battery cells and wherein at least one equalization device is arranged in each battery for balancing the battery cells within the battery, wherein the balancing device being arranged to at least collect information about voltage of at least one battery cell in each battery from the at least one equalization device and determining the balancing status of the batteries on the basis of the collected Information, the balancing device further being arranged to determine a target cell voltage for at least one battery cell in dependency of the balancing status and provide the target cell voltage to each equalization device to control the balancing of the battery cells, where the balancing device is arranged to discharge and/or charge the batteries to achieve the same or a similar charge state for the batteries when the balance process is completed.

6. A method for balance processing of charge states of a plurality of batteries adapted to be connected in parallel and being disconnected from each other and from external loads, wherein each of the battery is divided into a plurality of battery cells and wherein at least one equalization device is arranged in each battery for balancing the battery cells within the battery, comprising:

at least collecting information about voltage of at least one battery cell in each battery from the at least one equalization device, disconnecting the batteries from each other and from external loads before a balancing status is determined, determining the balancing status of the batteries on the basis of the collected information, determining a target cell voltage for a battery cell in dependency of the balancing, status, providing the target cell voltage to each equalization device to control the balancing of the battery cells, discharging and/or charging the batteries to achieve the same or a similar charge state for the batteries when the balance process is completed.

* * * * *